US008373571B2

(12) United States Patent
Henson et al.

(10) Patent No.: US 8,373,571 B2
(45) Date of Patent: Feb. 12, 2013

(54) METHODS AND APPARATUS FOR CONTROLLING A NOTIFICATION APPLIANCE CIRCUIT

(75) Inventors: James C. Henson, Annandale, NJ (US); Karen D. Lontka, Randolph, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 409 days.

(21) Appl. No.: 12/322,839

(22) Filed: Feb. 6, 2009

(65) Prior Publication Data

US 2010/0066557 A1 Mar. 18, 2010

Related U.S. Application Data

(60) Provisional application No. 61/027,130, filed on Feb. 8, 2008, provisional application No. 61/027,144, filed on Feb. 8, 2008.

(51) Int. Cl.
*G08B 21/00* (2006.01)

(52) U.S. Cl. .......... 340/664; 340/501; 340/657; 361/58; 713/300; 713/324

(58) Field of Classification Search ............... 340/693.1, 340/635, 652, 657, 664, 501; 361/58; 713/300, 713/324
See application file for complete search history.

(56) References Cited

U.S. PATENT DOCUMENTS

| 4,224,538 | A | * | 9/1980 | Cholin | 327/493 |
| 4,489,312 | A | * | 12/1984 | Yoshizaki | 340/514 |
| 4,520,348 | A | * | 5/1985 | Swanson | 340/508 |
| 4,916,432 | A | * | 4/1990 | Tice et al. | 340/518 |
| 4,954,809 | A | * | 9/1990 | Right et al. | 340/516 |
| 4,973,943 | A | * | 11/1990 | Arima | 340/506 |
| 5,559,492 | A | * | 9/1996 | Stewart et al. | 340/331 |
| 5,598,139 | A | * | 1/1997 | Karim et al. | 340/286.11 |
| 5,608,375 | A | * | 3/1997 | Kosich | 340/293 |
| 5,705,979 | A | * | 1/1998 | Fierro et al. | 340/517 |
| 5,754,103 | A | * | 5/1998 | Kanai et al. | 340/507 |
| 5,801,913 | A | * | 9/1998 | Pittel | 361/71 |
| 5,886,620 | A | | 3/1999 | Stewart et al. | |
| 5,955,946 | A | * | 9/1999 | Beheshti et al. | 340/506 |
| 5,966,002 | A | * | 10/1999 | Barrieau et al. | 323/222 |
| 6,049,446 | A | * | 4/2000 | Ha et al. | 361/58 |

(Continued)

FOREIGN PATENT DOCUMENTS

| WO | 0051218 | | 8/2000 |
| WO | WO 00-51218 | * | 8/2000 |

(Continued)

OTHER PUBLICATIONS

Vishay Siliconix, "In-Rush Current Limit MOSFET Driver", Apr. 5, 1999, http://www.siliconix.com/www/data/pwric/70028.pdf>.

(Continued)

*Primary Examiner* — Benjamin C Lee
*Assistant Examiner* — Quang D Pham

(57) ABSTRACT

An arrangement for use in a safety notification system includes an alarm signal power source, a first semiconductor device, a current sensing unit, and a controller unit. The alarm signal power source is configured to generate bias power for activating a notification appliance circuit of a notification system. The first semiconductor device has a load path coupled between the alarm signal power source and the notification appliance circuit. The current sensing unit is operably coupled to generate a sensing signal that is dependent on the current in the load path. The controller circuit is operably connected to receive the current sensing signal and to control the first semiconductor device responsive to a current sensing signal that exceeds an in-rush current threshold.

16 Claims, 4 Drawing Sheets

U.S. PATENT DOCUMENTS

| | | | | |
|---|---|---|---|---|
| 6,163,263 | A * | 12/2000 | Tice et al. | 340/635 |
| 6,313,744 | B1 * | 11/2001 | Capowski et al. | 340/514 |
| 6,384,723 | B1 * | 5/2002 | Keeler et al. | 340/513 |
| 6,400,203 | B1 * | 6/2002 | Bezzi et al. | 327/309 |
| 6,603,644 | B2 * | 8/2003 | Yeh | 361/31 |
| 7,400,227 | B2 * | 7/2008 | Becker et al. | 340/286.05 |
| 7,508,303 | B2 * | 3/2009 | Capowski et al. | 340/506 |
| 8,063,763 | B2 * | 11/2011 | Barrieau et al. | 340/514 |
| 2002/0015272 | A1 * | 2/2002 | Hattori | 361/93.1 |
| 2004/0026529 | A1 * | 2/2004 | Float et al. | 239/63 |
| 2006/0007620 | A1 * | 1/2006 | Ochi | 361/93.1 |
| 2007/0241875 | A1 * | 10/2007 | Costa | 340/501 |
| 2008/0211678 | A1 * | 9/2008 | Andres et al. | 340/603 |
| 2008/0266076 | A1 * | 10/2008 | Barrieau et al. | 340/506 |
| 2009/0009346 | A1 * | 1/2009 | Hojmose et al. | 340/628 |
| 2009/0009352 | A1 * | 1/2009 | Savage et al. | 340/663 |
| 2009/0045937 | A1 * | 2/2009 | Zimmerman | 340/506 |
| 2009/0167544 | A1 * | 7/2009 | Becker et al. | 340/636.12 |

FOREIGN PATENT DOCUMENTS

WO 2007058569 A1 5/2007

OTHER PUBLICATIONS

International Search Report Including Notification of Transmittal of the International Search Report, International Search Report and Written Opinion of the International Searching Authority.

* cited by examiner

METHODS AND APPARATUS FOR CONTROLLING A NOTIFICATION APPLIANCE CIRCUIT

This application claims the benefit of U.S. Provisional Patent Application Ser. No. 61/027,130, filed Feb. 8, 2008, and U.S. Provisional Patent Application Ser. No. 61/027,144, filed Feb. 8, 2008, both of which are incorporated herein by reference.

FIELD OF THE INVENTION

The present invention relates to circuits in building systems that provide signals to devices distributed at different areas of a building or facility.

BACKGROUND

Fire safety systems include, among other things, detection devices and notification devices. Detection devices include smoke, heat or gas detectors that identify a potentially unsafe condition in a building or other facility. Detection devices can also include manually operated pull stations. Notification devices, often referred to as notification appliances, include horns, strobes, and other devices that provide an audible and/or visible notification of an unsafe condition, such as a "fire alarm".

In its simplest form, a fire safety system may be a residential "smoke alarm" that detects the presence of smoke and provides an audible alarm responsive to the detection of smoke. Such a smoke alarm device serves as both a detection device and a notification appliance.

In commercial, industrial, and multiple-unit residential buildings, fire safety systems are more sophisticated. In general, a commercial fire safety system will include one or more fire control panels that serve as distributed control elements. Each fire control panel may be connected to a plurality of distributed detection devices and/or a plurality of distributed notification appliances. The fire control panel serves as a focal point for problem-indicating signals that are generated by the distributed detection devices, as well as a source of activation (i.e. notification) signals for the distributed notification appliances. Most fire safety systems in larger buildings include multiple fire control panels connected by a data network. The fire control panels employ this network to distribute information regarding alarms and maintenance amongst each other. In such a way, notification of a fire or other emergency may be propagated throughout a large facility.

Moreover, centralized control of multiple fire control panels in large safety systems can be accomplished by a dedicated or multi-purpose computing device, such as a personal computer. Such a centralized computing device, sometimes referred to as a control station, is typically configured to communicate with the multiple fire control panels via the data network.

Using this general architecture, fire safety systems are scalable to accommodate a number of design factors, including the building layout, the needs of the building management organization, and the needs of the users of the building. To achieve scalability and flexibility, fire safety systems may include, in addition to one or more control stations, remote access devices, database management systems, multiple networks of control panels, and literally hundreds of detection and notification devices. Fire safety systems may further incorporate and/or interact with security systems, elevator control systems, sprinkler systems, and heating, ventilation and air conditioning ("HVAC") systems.

One of the many sources of costs in fire safety systems is the wiring and material costs associated with the notification appliances. Building safety codes define the specification for notification appliance wiring, voltage and current. For example, according to building safety codes, notification appliances are intended to operate from a nominal 24 volt signal which provides the power for the notification appliance to perform its notification function. For example, an alarm bell, a strobe light, or an electronic audible alarm device operates from a nominal 24 volt supply. In general, however, notification devices are required to operate at voltages as low as 16 volts. The delivery of power to the distributed notification appliances requires a significant amount of wiring and/or a significant number of distributed power sources.

In particular, notification appliances are typically connected in parallel in what is known as a notification appliance circuit or NAC. Each NAC is connected to a power source, such as a 24 volt source, and includes a positive conductor, a ground conductor, and multiple notification appliances connected across the two conductors. The power source may be disposed in a fire control panel or other panel. The positive and ground NAC conductors serve to deliver the operating voltage from the 24 volt power source, to the distributed notification appliances. Because the positive and ground conductors have a finite conductance, i.e. they have impedance, there is a practical limit to how long an NAC may extend from the power source before the voltage available across the NAC conductors falls below the required operating voltage.

To address the limitations of NACs due to voltage drop, extending the coverage of notification appliances often requires increasing the number of power sources. To this end, special powered appliance circuit extension devices may be employed. These powered extension devices are panels that are connected to an existing fire control panel and emulate a notification appliance or device to that fire control panel. Each powered extension device then provides NAC powered signals to additional NACs. The power extension device thus forms a form of "repeater" for the notification signal voltage. The use of the powered extension devices effectively extends the coverage beyond that may be achieved with a single fire control panel. The powered extension device is less costly to implement than a fire control panel.

To date, one of the issues relating to the powered extension devices includes the reliability of the switching elements used to connect alarm signals to the NAC. Switching elements are necessary to controllably connect the 24 volt alarm notification signal to the NAC. In particular, in the past, when an extension device would receive an "alarm notification signal" from its corresponding fire control panel, the extension device would connect its own 24 volt power supply to its extended NAC using a relay. Relay contacts, however, present undesirable reliability issues. While some reliability issues may be partly addressed by using high quality relays, such relays significantly increase the cost of implementation.

Accordingly, there exists a need to reduce costs and increase reliability in notification appliance circuits of fire safety systems, as well as the devices that provide power to those notification appliance circuits.

SUMMARY OF THE INVENTION

The above described needs, as well as others, are addressed by at least some embodiments of the invention that employ a semiconductor device instead of relays to actuate notification devices in an NAC. In addition, at least some embodiments of the invention employ a hot swap controller or similar control scheme to limit in-rush current that could damage the semiconductor device.

A first embodiment of the invention is an arrangement for use in a safety notification system that includes an alarm signal power source, a first semiconductor device, a current sensing unit, and a controller unit. The alarm signal power source is configured to generate bias power for activating a notification appliance circuit of a notification system. The first semiconductor device has a load path coupled between the alarm signal power source and the notification appliance circuit. The current sensing unit is operably coupled to generate a sensing signal that is dependent on the current in the load path. The controller circuit is operably connected to receive the current sensing signal and to control the first semiconductor device responsive to a current sensing signal that exceeds an in-rush current threshold.

In specific embodiments the controller is also used to control the first semiconductor switch to provide an alarm signal pattern to the NAC.

One advantage of at least one embodiment is that the control circuit allows for a MOSFET (or other semiconductor device) as the main controllable connection/disconnection device between the alarm voltage and the NAC devices.

The above describe features and advantages, as well as others, will become more readily apparent to those of ordinary skill in the art by reference to the following detailed description and accompanying drawings.

DETAILED DESCRIPTION

Figure 1:
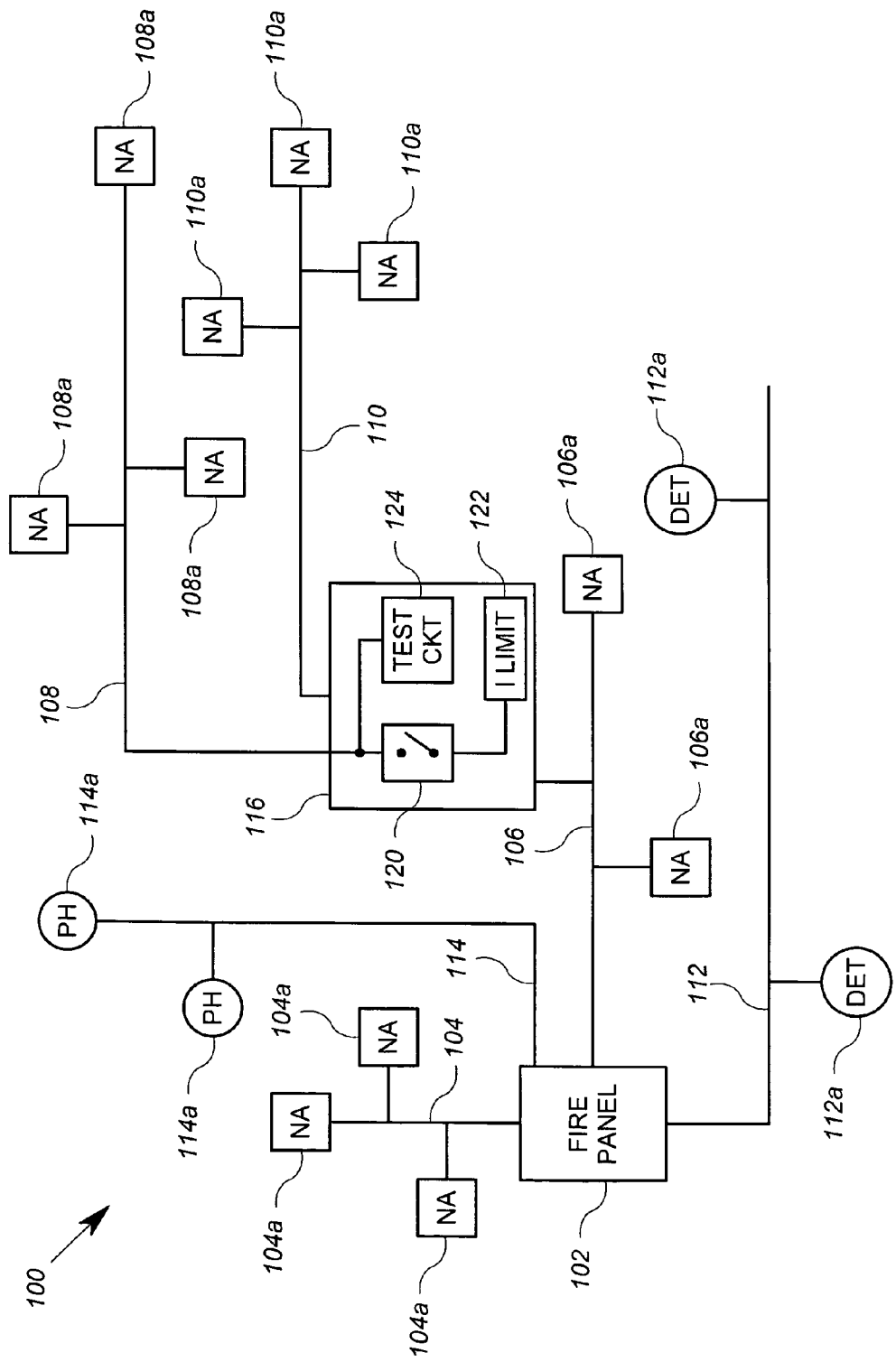
FIG. 1 shows a schematic block diagram of a portion of an exemplary fire safety system that incorporates an embodiment of the present invention.

FIG. 1 shows a safety alarm notification system that incorporates an arrangement according to the invention. The safety alarm notification system 100 includes a fire control panel 102, a plurality of notification appliance loops 104, 106, a plurality of extended notification appliance loops 108 and 110, a plurality of notification appliances 104a, 106a, 108a, 110a, a plurality of detector loops 112, 114, a plurality of detection devices 112a, 114a, and a notification extension system 116. In general, the safety alarm notification system 100 is illustrated in simplified format for exposition purposes. Most safety alarm notification systems will include multiple interconnected control panels, not shown, but similar to the fire control panel 102. Multiple loops and devices would emanate from each fire control panel. Moreover, central control stations and other supervisory and monitoring equipment, not shown, are typically employed. Such devices are omitted from FIG. 1 for clarity of exposition.

The fire control panel, or simply "fire panel," 102 is a device that manages, powers and communicates with the notification appliances 104a, 106a, 108a, 110a and the detection devices 112a, 114a. Specific operations and capabilities of the fire panel 102 will become more readily apparent as the remainder of the system 100 is described below. In any event, the fire panel 102 is preferably a device that is commercially available, such as, for example, the model XLS, MXL, FS250 devices available from Siemens Building Technologies, Inc. In general the fire panel 102 is operable to receive indication of a potential hazard via one or more of the detection devices 112a, 114a and communicate the existence that indication to a centralized control station, not shown, as well as to other fire panels, also not shown. The fire panel 102 is further configured to provide a signal (and power) to at least the notification appliances 104a, 106a responsive to a command received from the centralized control station, responsive to a signal received from another fire panel, or responsive to the reception of an indication of a potential hazard via one or more the detection devices 112a, 114a. The fire panel 102 also has the capability of detecting equipment malfunctions on the device loops 112, 114 and the notification appliance loops 104, 106.

The notification appliances 104a, 106a are devices that are distributed throughout a building or facility and are configured to provide a visual and/or audible indication of an alarm condition. As is known in the art, notification appliances include alarm bells, electronic alarm devices, strobes, loudspeaker and other similar devices. The notification appliances 104a, 106a are connected to the fire panel 102 via the respective notification appliance loops 104, 106. Notification appliances 104a, 106a are normally in a ready state. In the ready state, no alarm condition is present, but the appliance is capable of generating the notification (i.e. the audible or visual indication) in the event of receiving appropriate inputs from the fire panel 102 via the respective notification appliance loop 104, 106.

The notification appliance loops 104, 106 are the powered conductors that connect the fire panel 102 to the distributed notification appliances 104a, 106a. Collectively, the notification appliance loops 104, 106 and their respective notification appliances 104a, 106a form a notification appliance circuit or NAC.

Notification loops (and their NACs) can be configured in one of two ways, commonly known as class A and class B operation. Further detail regarding class A and class B configurations are discussed further below in connection with FIGS. 3a and 3b.

Referring again to FIG. 1, the detection devices 112a, 114a are devices that are distributed throughout a building or facility and are configured to detect a safety hazard, such as the presence of smoke, fire, or noxious gasses. Upon detection of a safety hazard, the detection devices 112a, 114a communicate information indicating the detection to the fire panel 102 via the corresponding detector loop 112. The detection devices 112a, 114a may include network capable smoke detection devices well known in the art, such the FP11, HFP11, HFPO11, available Siemens Building Technologies, Inc. Detection devices 112a, 114a may also include manual pull stations that are triggered by manual action of a building occupant. Such detection devices are well known in the art and are included here only for contextual purposes. The detection loops 112, 114 provide the electrical communication link between the detection devices 112a, 114a and the fire panel 102. Such loops and their operation are also well known in the art.

The notification appliances 108a, 110a may suitably be substantially the same kinds of devices as the notification appliances 104a, 106a. However, the notification appliances 108a, 110a are connected to the notification extension system 116, as will be discussed below in further detail.

The notification extension system 116 is a device that provides an extension from a first notification appliance loop to further appliance loops, in order to extend the range of coverage via the first appliance loop. For example, as shown in FIG. 1, the notification extension system 116 provides an extension from the notification appliance loop 106 to further loops 108, 110. As discussed above, there is a physical distance limitation on notification appliance loops 104, 106 due to voltage losses along the wire of the loops. The notification extension system 116 provides, among other things, a voltage boost sufficient to power the further notification appliance loops 108, 110.

As discussed further above, the notification extension system 116 in some manner emulates a notification appliance to the fire panel 102. To this end, the notification extension system 116 is configured to receive notification signals from the fire panel 102. These notification signals signify that an alarm should be indicated in the same manner as the notification appliances 106a. However, instead of (or in addition to) providing a visual or audible notification in response to such a notification signal, the notification extension system 116 is configured to generate further notification signals and provide these signals to the notification appliances 108a, 110a via the further notification loops 108, 110. Thus, the notification extension system 116 provides greater coverage of the fire panel 102, and the notification appliance loop 106.

In accordance with at least one embodiment of the present invention, the notification extension system 116 includes, among other things, at least one semiconductor device 120 that controllably connects the notification signal to the notification appliances 108a, 110a, and a circuit 122 that helps limit in-rush current to the semiconductor device 120. In some embodiments, the notification extension system 116 further includes a test circuit 124 configured to test the notification appliance loops 108 and 110 for continuity and short circuits.

Referring again to the first embodiment described herein, operation of the circuit of FIG. 1 will be briefly discussed. Under normal circumstances, the notification appliances 104a, 106a, 108a, 110a are in a ready state, but generate no audible or visible notification signal. These normal circumstances represent the ordinary day-to-day operation of the building in which no fire or other emergency exists. The fire safety system 100, or portions thereof, are tested from time to time to ensure that the system is in a ready state. Occasionally, a malfunction may occur in a notification loop (e.g. 104, 108) or one of the devices (106a, 108a, 112a). These malfunctions may be uncovered by the testing operations. For example, the test circuit 124 of the notification extension device 116 (or a similar circuit in the fire panel 102) may be used to test the notification loops (e.g. 104, 108) for continuity without causing actuation of the notification appliances.

An alarm event occurs when an unsafe condition has been detected. For example, one of the detector devices 112a may detect a smoke condition indicative of a smoke/fire event. The detector device 112a would effectuate communication of the alarm condition to the fire panel 102. Alternatively, an alarm event may be detected by another device connected to another fire control panel, not shown. Such an alarm event would be communicated to the fire panel 102 by the other fire control panel.

Upon indication of an alarm event, the fire control panel 102 provides a notification signal to each of the notification loops 104, 106. Each of the notification devices 104a, 106a receives the notification signal and generates an audible and/or visible notification that alerts the occupants of the building of the detected unsafe condition. In addition, the notification extension device 116 receives the notification signal from the fire panel 102 via the notification loop 106.

The notification extension device 116 then generates another notification signal for the extension loops 108, 110. To this end, the at least one semiconductor device 120 controllably connects a notification signal voltage (e.g. 24 volts) generated within the notification extension device 116 to each of the loops 108, 110. It has been determined that when the devices loops 108, 110 are first connected, the appliances 108a and 110a can create an in-rush current that can degrade the semiconductor switch 120. In this embodiment, the in-rush limiting circuit 122 operates to reduce this in-rush current.

Referring generally to the embodiment of FIG. 1 described above, FIG. 2 shows an exemplary block diagram of a notification extension device 202 that may suitably be employed as the notification extension device 116 of FIG. 1.

Figure 2:
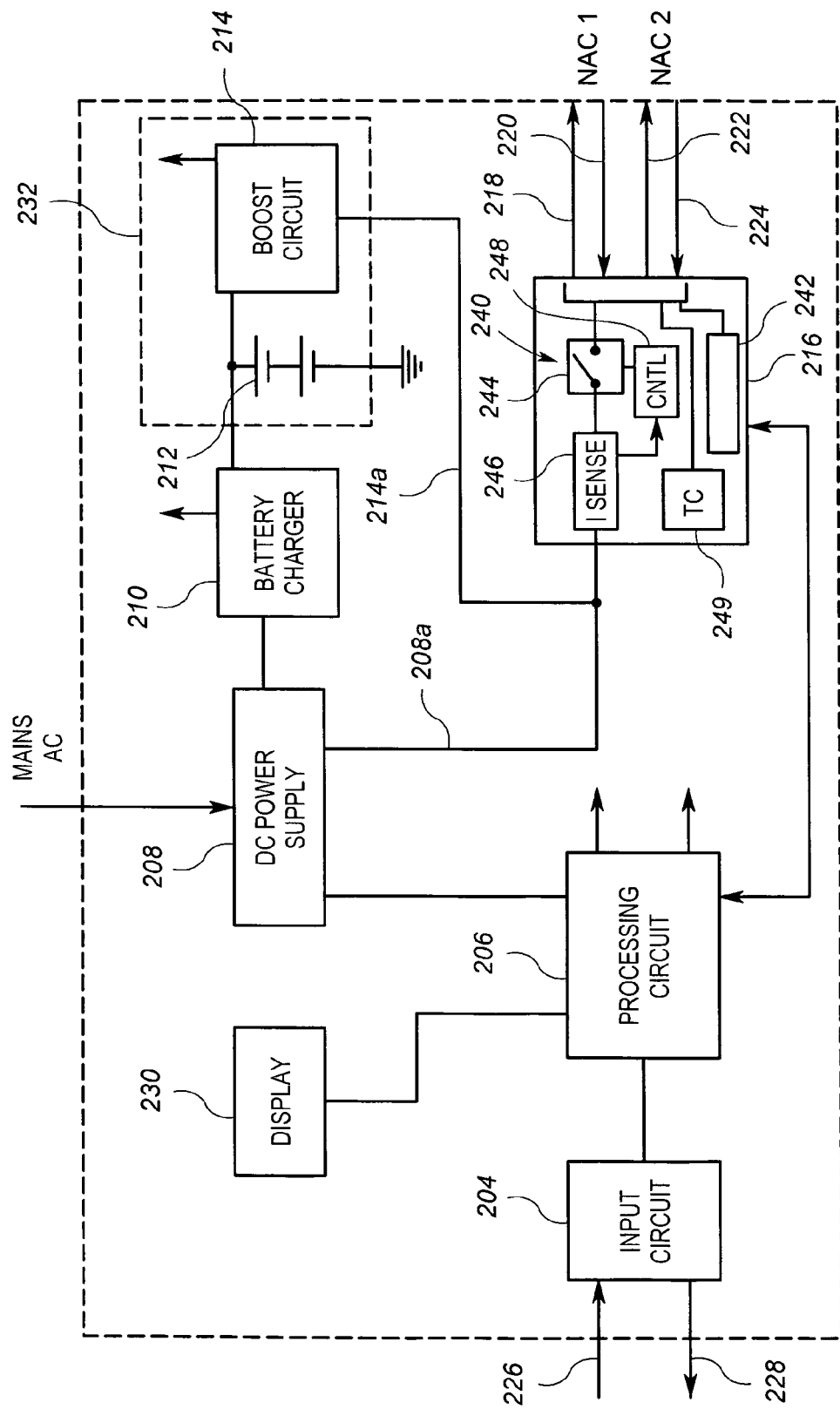
FIG. 2 shows a schematic block diagram of a notification extension device that incorporates an exemplary embodiment of the present invention.

Referring now to FIG. 2, the notification extension device 202 includes an input circuit 204, a processing circuit 206, a DC power supply 208, a battery charger circuit 210, a battery circuit 212, a boost circuit 214, and an output circuit 216. Moreover, the output circuit 216 includes first and second in-rush current management arrangements 240, 242. Each of the in-rush current management arrangements includes at least a first semiconductor device 244, a first current sensing unit 246 and a first controller circuit 248. The output circuit 216 ideally also includes a test circuit, not shown in FIG. 2 but shown in the detailed example of the output circuit 216 shown in FIG. 4.

The notification extension device 202 also includes NAC inputs 226, 228, NAC outputs 218, 220, 222 and 224, and a display 230. The NAC inputs 226, 228 connect to conductors of a notification loop and are configured to receive notification signals generated by another source via that notification loop. By contrast, the NAC outputs 218, 220, 222 and 224 are connected to originate and provide notification signals. The NAC outputs 218, 220, 222 and 224 may provide notification signals to devices of two NACs in class A configuration, or devices of one NAC in class B configuration.

Figure 3A:
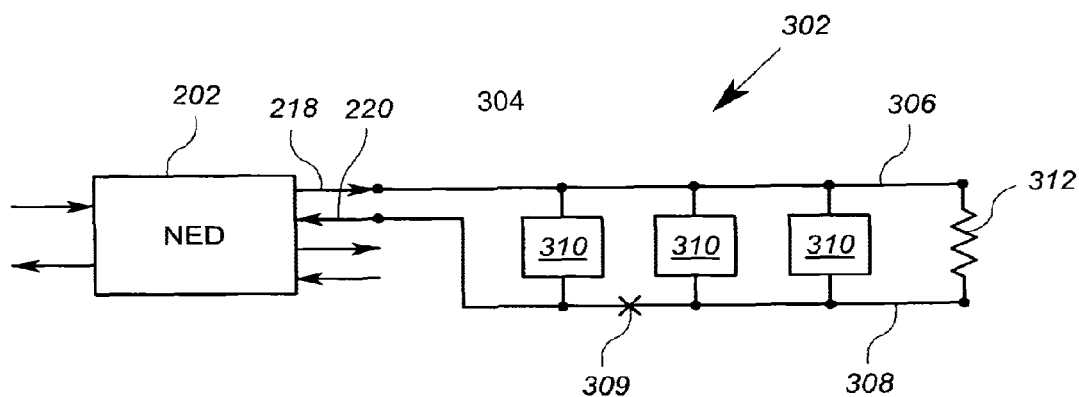
FIGS. 3a and 3b shows a schematic diagram of NACs configured for class A and class B operation, respectively.
Figure 3B:
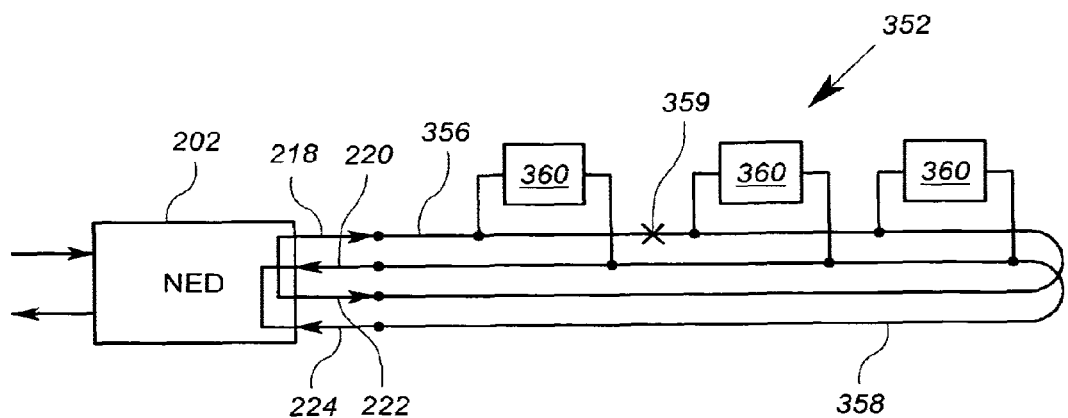

In particular, FIGS. 3a and 3b show the notification extension device 202 connected in class A and class B configurations, respectively. In particular, FIG. 3a shows the notification extension device 202 connected to an NAC 302 configured for class A operation, and FIG. 3b shows the notification extension device 202 connected to an NAC 352 for class B operation.

Referring to FIG. 3a, the NAC includes a feed conductor 306, a return conductor 308, a plurality of notification appliances 310, and an end-of-line (EOL) resistor 312. The feed conductor 306 is a length of conductor (e.g. 14 or 16 gauge wire) that is connected to the outputs a positive voltage (24-26 VDC) output terminal 218 of the notification extension device 202, and extends throughout a building or portion of a building such that it passes proximate to, and is electrically connected to, each of the notification appliance devices 310. The return conductor 308 is a length of similar conductor that is connected to a return reference voltage (e.g. ground) terminal 220 of the notification extension device 202. The return conductor 308 also extends through the same portion of the building such that it passes proximate to, and is electrically connected to, each of the notification appliance devices 310. In this manner, a complete circuit is formed through each of the notification devices 310 by the notification extension device 202, the feed conductor 306, and the return conductor 308.

The EOL resistor 312 is coupled between the remote terminal end portions of the feed conductor 306 and the return conductor 308. One use of the EOL resistor 312 is to provide a path for testing the continuity of feed conductor 306 and return conductor 308. In particular, a voltage can be applied across the feed conductor 306 and return conductor 308 and the current measured at the source panel 304 for continuity. The test voltage can be selected such that it does not activate the notification appliances 310, nor pass current therethrough. In the embodiments described herein, the test voltage applied is a negative voltage. For example, the test circuit 249 (see FIG. 2) applies −12 volts DC is applied to the feed conductor 306. Such a voltage does not activate the notification devices 310, and the only current path is through the EOL resistor 312. As will be discussed below, the notification extension device 202 includes circuitry capable of determining whether the test voltage has passed through the EOL resistor 312 without and open or short circuit on either of the feed conductor 306 or the return conductor 308.

During normal (i.e. non-test operation), the notification extension device 202 does not provide any signal on the feed conductor 306. If an alarm notification is to be provided, the source panel 304 provides a notification signal to the feed conductor 306. The notification signal is received by each of the notification devices 310. The voltage in the notification signal causes the notification devices 310 to provide visual or audible notification indications. The alarm notification signal may take the form of a constant DC voltage, or a sequential signal of 24 volt pulses.

One of the drawbacks of the class A configuration shown in FIG. 3a is that a single open in the feed conductor 306 or return conductor 308 will disable any devices beyond the position of the open. For example, if an open circuit occurs at position 309, then the two most remote notification appliances 310 will not have be activated. As a consequence, many facilities employ the class B configuration, which allows for full operation even in the event of an opening in one of the conductors.

FIG. 3b shows the notification extension device 202 connected to an NAC 352 in the class B configuration. The NAC 352 includes a feed conductor 356, a return conductor 358, and a plurality of notification appliances 360. The feed conductor 356 is a length of conductor (e.g. 14 or 16 gauge wire) that is connected to a positive voltage (24-26 VDC) output terminal 218 of the notification extension device 202, and extends throughout a building or portion of a building such that it passes proximate to, and is electrically connected to, each of the notification appliance devices 360. The feed conductor 356, however, unlike the feed conductor 306 of FIG. 3a, loops back to the notification extension device 202 and connects to the output terminal 222, which also is connected to the positive voltage.

Similarly, the return conductor 358 is a length of conductor that is connected to a return reference voltage (e.g. ground) terminal 220 of the notification extension device 202. The return conductor 358 also extends through the same portion of the building such that it passes proximate to, and is electrically connected to, each of the notification appliance devices 360. The return conductor 358 also makes a complete loop and terminates at another ground terminal 224 of the notification extension device 202.

In this manner, a complete circuit is formed through each of the notification devices 360 by the notification extension device 202, the feed conductor 356, and the return conductor 358. An EOL resistor, not shown, may be employed within the notification extension device 202 to connect the terminals 220 and 222. The EOL resistor within the source panel 354 may also be used for testing the continuity of the feed conductor 306 and the return conductor 308.

The normal operation of the NAC 352 is essentially identical to the normal operation of the NAC 302 of FIG. 3a. The only significant difference is that the NAC 352 will continue to fully function even if there is a break in the conductor. In particular, the loop backs of the feed conductor 356 and the return conductor 358 act as redundant connections. For example, if the feed conductor 356 is broken (i.e. open circuited) at point 359, all of the notification devices 360 on either side of the break point 359 still receive the feed voltage, albeit from different terminals of the notification extension device 202. Thus, the class B connection provides the advantage of being able to tolerate at least one fault temporarily with little or no reduction in service.

It can further be appreciated from FIG. 3a that in class A configuration, the notification extension device 202 can connect to two different NACs. Specifically, the NAC outputs 218, 220 connect to the loop conductors 306, 308 of the first NAC 302, and the NAC outputs 222, 224 can be connected to connect to the loop conductors of a second NAC, not shown.

Referring again to FIG. 2, the input circuit 204 is operably coupled to the NAC inputs 226, 228 and is configured to emulate a notification appliance device connected between the NAC inputs 226 and 228. The input circuit 204 is further configured to receive an ordinary 18-24 volt notification signal generated between the NAC inputs 226, 228. The input circuit 204 is configured to provide an indication of the existence of the notification signal to the processing circuit 206. The details of a suitable input circuit would be known to those of ordinary skill in the art.

The processing circuit 206 is a processing circuit that is configured to carry out the logical and supervisory operations of the device 202. To this end, the processing circuit may include a programmable microprocessor or microcontroller. In general, the processing circuit 206 is configured to receive an indication that a notification signal has been received at the input circuit 204 and to generate a command causing the output circuit 216 to provide a notification signal on the NAC outputs 218, 220, 222 and 224. The processing circuit 206 further provides the signals to enable and disable the DC power supply 208 and the boost circuit 214. The processing circuit 206 is also configured to control the indicators on the display 230. The processing circuit 206 may also suitably be configured to test battery voltage of the battery circuit 212, as well as to oversee and evaluate tests of the NACs connected to the outputs 218, 220, 222 and 224.

Moreover, the processing circuit 206, as will be discussed below in detail, cooperates with the elements of the output circuit 216 to carry out various operations thereof.

The display 230 may suitably be any device that is capable of communicating at least rudimentary information regarding the devices and/or NACs associated with the device 202. For example, the display 230 may include a plurality of LED indicators, not shown, which are illuminated to indicate a certain condition, such as trouble, a malfunction, circuit power, or other conditions. Suitable display arrangements would be known to those of ordinary skill in the art.

The DC power supply 208 is a power supply circuit that converts mains AC electrical power to 26 volts DC for use by the output circuit 216 in generating notification signals. The DC power supply 208 also provides lower DC voltage values at other outputs, not shown, to power the processing circuit 206 and other logical elements in the device 202. The DC power supply 208 in some embodiments provides power to the battery charger 210. The DC power supply 208 may be a well-known configuration of a transformer, diodes and capacitors with little or no output voltage regulation.

The battery charger 210 is a circuit that generates a charging voltage that is provided to the battery circuit 212. Suitable battery charging circuits for use in fire safety equipment are well known in the art.

The battery circuit 212 in this embodiment includes two series-connected 12-volt batteries and generates a nominal voltage of 24 volts DC. As is well known in the art, however, the battery voltage will vary, and the battery circuit 212 may generate 20.4 to 26 volts throughout the useful life of the batteries. The batteries may suitably be lead acid batteries.

In this embodiment, the boost circuit 214 is provided to boost the output voltage of the battery circuit to a slightly higher voltage (i.e. 26 volts) to allow for the attached NAC to employ longer conductors. In particular, as discussed in co-pending U.S. patent application Ser. No. 12/148,288, filed Apr. 17, 2008, which is incorporated herein by reference, employing a higher output voltage for notification signals helps compensate for $I^2R$ losses that occur over the length of the feed and return conductors of the NAC. Thus, the boost circuit 214 is a circuit that receives the output voltage of the battery circuit 212 and generates a substantially consistent output voltage of approximately 26 volts. To this end, the boost circuit 214 may suitably comprise a switching DC-DC converter in the form of a boost converter. Such a circuit would include feedback control of the switch to maintain a consistent output voltage. Further detail regarding an exemplary embodiment of the boost circuit 214 is discussed in U.S. patent application Ser. No. 12/148,288.

The battery circuit 212 and the boost circuit 214 thus cooperate to form a DC power back-up unit 232 that provides a consistent output voltage throughout the useful lifetime of the batteries in the battery circuit 212. The DC power back-up unit 232 may be implemented in any fire control device that powers a NAC or other circuit that is normally powered by two 12-volt batteries.

The output circuit 216 is a circuit that is configured to generate notification signals under the command of the processing circuit 206. The power for the notification signals is derived from the output voltage of either the DC power supply 208 or the boost circuit 214 to the NAC outputs 218, 220, 222 and 224. The output circuit 216 may be configured in class B configuration to provide notification signals to a single NAC, or in class A configuration to provide signals to two NACs. (See FIGS. 3a and 3b)

The in-rush management circuits 240, 242 operate to provide protection against in-rush currents that can damage semiconductor switches in the path of the notification signals. In general, the in-rush current management circuit 240 provides protection in the path to the NAC outputs 218, 220, and the in-rush current management circuit 242 provides protection in the path to the NAC outputs 222, 224. However, if the output circuit 216 is configured for class B operation, then only the first in-rush current management circuit 240 is required.

As discussed above, each of the in-rush current management circuits includes a first semiconductor device 244, a current sensing unit 246 and a controller circuit 248. The semiconductor device 244 has a load path coupled between the alarm signal power source, for example, the lines 208a and 214a, and NAC outputs 218, 220, 222 and 224. The current sensing unit 246 is operably coupled to generate a sensing signal that is dependent on the current in the load path of the semiconductor device 244. The controller circuit 248 is operably connected to receive the current sensing signal and to control the first semiconductor device 244 responsive to a current sensing signal that exceeds an in-rush current threshold. In a preferred embodiment, the controller circuit 248 includes a hot swap controller.

In general, the in-rush current management arrangement 240 is configured to handle short, instantaneous current spikes that can occur when notification appliances in the connected NACs are initially powered. In particular, when the output circuit 216 generates a notification signal on the NAC outputs 218, 220, 222 and 224, the notification appliances connected to the NAC outputs 218, 220, 222 and 224 can generate an initial current spike. During this spike, which is detected via the current sensing unit 246, controller circuit 248 controls the current flowing through the semiconductor device 244 to provide the necessary current limitation to protect the internal devices during the brief surge. Further detail regarding the operation of this circuit is provided in connection with FIG. 4, below.

In operation, the notification extension device 202 monitors the NAC input 226, 228 for a notification signal indicative of trouble, or any other reason that the notification devices should be activated. Upon detection of a notification signal at the NAC input 226, 228, the input circuit 204 provides a logical indication signal to the processing circuit 206. The processing circuit 206, responsive to receiving the indication signal from the input circuit 204, provides a signal the output circuit 216 indicating that the output circuit 216 should generate a notification signal on the NAC outputs 218, 220, 222 and 224.

The processing circuit 206 further enables the output 208a of the DC power supply 208 if the mains AC power is available. In such a case, the processing circuit 206 furthermore disables the output of the boost circuit 214. As a consequence, only the DC power supply 208, and not the DC back-up power unit 232, provides the signal power to the output circuit 216. In the event that the mains AC electrical power is not available, the processing circuit 206 disables the output 208a of the DC power supply 208 and enables the output 214a of the boost circuit 214. As a result, the DC power back-up unit 232 formed by the battery circuit 212 and the boost circuit 214 provides the power to the output circuit 216.

The output circuit 216 then provides the notification signal to the NAC outputs 218, 220, 222 and 224 using the power provided by either the DC power back-up unit 232 or the DC power supply 208. In some cases, the processing circuit 206 and the output circuit 216 cooperate to modulate information or strobe trigger signals on the notification signal. Such operations are known in the art. As will be discussed further below, the output circuit may suitably modulate information or signal patterns onto the notification signal power using the first semiconductor device 244, and may even employ the controller 248 to effectuate such modulation.

The above described device thus provides notification signals having a voltage that is relatively consistent, regardless of the exact output voltage of the battery circuit 212, assuming that the battery circuit 212 is operating within acceptable ranges. In this embodiment, the relatively consistent voltage exceeds the nominal rated 24 volts DC of the battery circuit 212.

It will be appreciated that a notification extension device 202 of FIG. 2, or alternatively of any power source that provides power to NACs, will typically be capable of connecting to more than one or two NACs. In such a case, it is preferable that separate boost circuits 214 be implemented on only those NACs that require the boost to avoid costs. This will allow the individual boost circuits to employ smaller and cheaper components as compared to a single boost circuit that provides power to all NACs, whether or not they require the boost. Moreover, additional in-rush current management circuits should be employed for each addition pair of NAC outputs.

Figure 4:
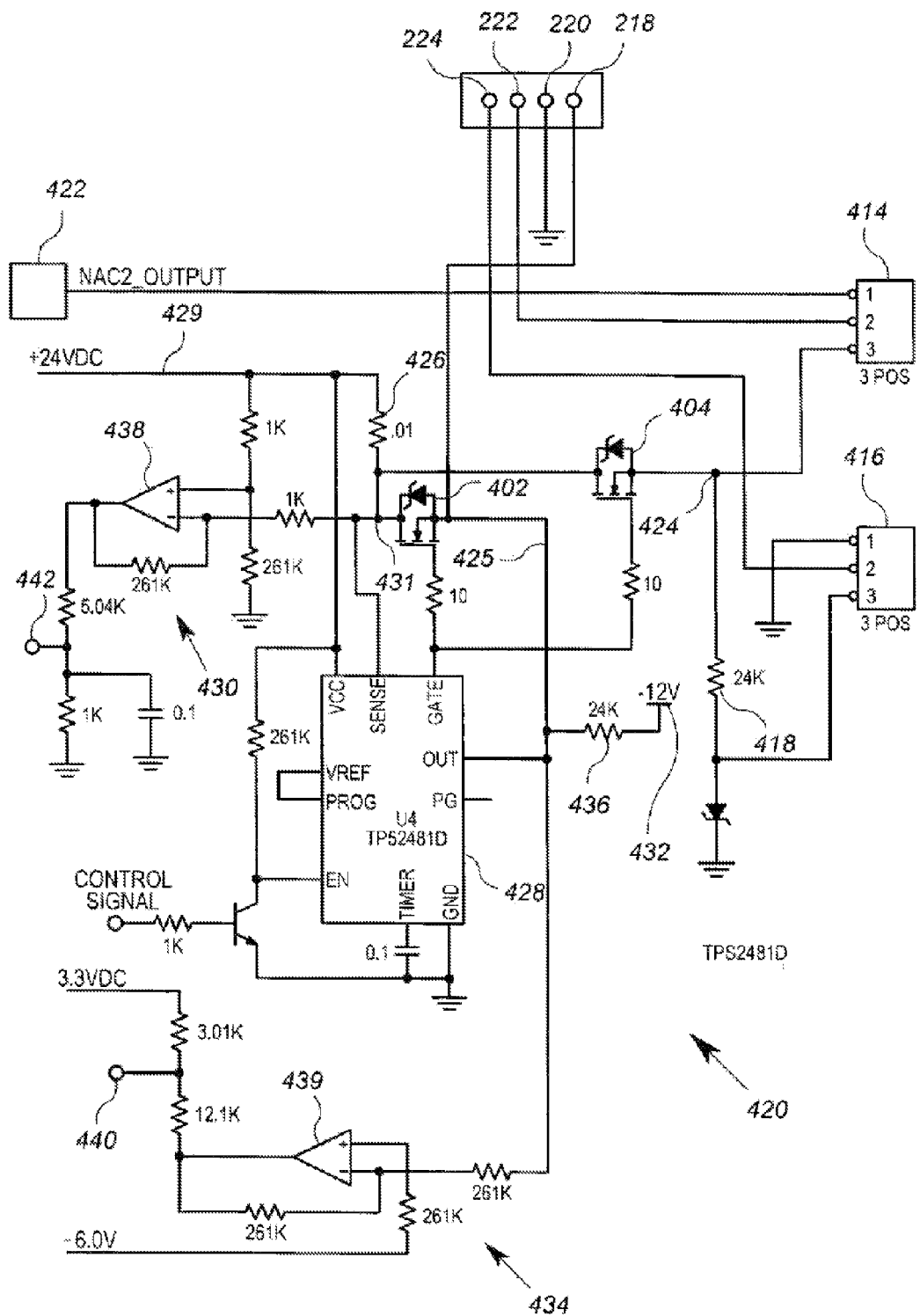
FIG. 4 shows a schematic block diagram of an exemplary embodiment of the output circuit of the notification extension device of FIG. 2.

FIG. 4 shows a detailed example of the output circuit 216 of FIG. 2. The output circuit includes a first output arrangement 420 and a second output arrangement 422. In general, the first output arrangement 420 includes, among other things, an exemplary embodiment of the first in-rush current management arrangement 240 of FIG. 2, and the second output arrangement 422 includes, among other things, an exemplary embodiment of the first in-rush current management arrangement 242 of FIG. 2. Only the first output arrangement 420 is shown in detail for purpose of clarity. The second output arrangement 422 may suitably have a similar structure.

In addition to the first and second output arrangements 420, 422, the output circuit 216 includes NAC outputs 218, 220, 222 and 224, an EOL resistor 418, and configurable terminals 414, 416. The NAC outputs 218, 220, 222 and 224 may suitably be connected to two NACs when in class A configuration (see FIG. 3a) or one NAC when in class B configuration (see FIG. 3b). The switchable terminals 414, 416, which may suitably take the form of a DIP switch, semiconductor switch, jumper terminals or other form, are configurable to a first state consistent with class A operation and a second state consistent with class B operation. In the first state, the switchable terminal 414 connects the NAC output 222 to an output of the second output arrangement 422, and the switchable terminal 416 connects the NAC output 224 to ground. In the second state, the switchable terminal 414 connects the NAC output 222 to a notification signal output 424 of the first output arrangement 420, and the switchable terminal 416 connects the NAC output 224 to the EOL resistor 418. The EOL resistor 418 is serially connected between the notification signal output 424 and the switchable terminal 416.

Referring now to the first output arrangement 420, the output arrangement 420 includes a current sense resistor 426, semiconductor switches 402, 404, a controller circuit 428, a current measurement circuit 430, a test voltage input 432, and a test voltage measurement circuit 434. The first output arrangement 420 includes a notification signal output 424 that is configured for use in class B configuration only, and a notification signal output 425 that is configured for use in class A and class B configurations.

The current sense resistor 426 is serially connected between a notification signal voltage source 429 and a current sense node 431. The source 429 may suitably be connected to the lines 208a, and/or 214a (see FIG. 2), which provide the 24-26 volt output for use as the notification signal. The first semiconductor switch 402, which in the form of a MOSFET, is coupled between the current sense node 431 and the first notification signal output 425. Similarly, the second semiconductor switch 404, which is also in the form of a MOSFET, is coupled between the current sense node 431 and the second notification signal output 424. The first notification signal output 425 is coupled to the NAC output 218, a terminal OUT of the controller circuit 428, and an input to the test voltage measurement circuit 434. The second notification signal output 424 is coupled to the configurable terminal 414.

The controller circuit 428 includes a current sense input SENSE coupled to the current sense node 431, and a bias voltage input VCC coupled to the source 429. With this configuration, the voltage drop between the inputs VCC and SENSE, divided by the resistance of the current sense resistor 426, provides a measure of the current between the source 429 and the NAC outputs 218 and 222. The controller circuit 428 is configured to detect whether the current through the resistor 426 exceeds a predetermined in-rush current threshold.

To this end, the controller circuit 428 may suitably comprise a hotswap controller, such as a model TPS2490 or TPS2491 hotswap controller available from Texas Instruments, Inc. Other hotswap controllers that have similar inputs and functions, for example, the MAX4271 controller available from Maxim, are commercially available and may also be used.

The controller circuit 428 further includes a controlled output GATE that is operably connected to the gates of the MOSFET switches 402 and 404. The controller circuit 428 is configured to regulate the gate voltage applied to the output GATE in response to the sensed current derived from the input SENSE. The gate voltage is regulated such that the in-rush current is controllably limited.

In addition, in this embodiment, the controller circuit 428 has an input EN that can be used to activate and deactivate the functions of the controller circuit 428, and in particular, the provision of a signal to the output GATE. The EN input is operably coupled to receive a control signal from the processing circuit 206 of FIG. 2. In general, the EN input may be used to turn the GATE output on and off to open and close, respectively, the MOSFET switches 402, 404. As a result, the control signal provided to the EN input may be used to enable and disable the delivery of notification signals to the NAC outputs 218, 220, 222 and 224 under the control of the processing circuit 206. Moreover, the EN input may be used to modulate pulses onto the notification signal. For example, if the notification signal is to take the form of repeating sequences of three one-second pulses, then the processing circuit 206 provides the control signal to the EN input as a logic signal having the desired pulse shape and sequence. The controller circuit 428 then provides corresponding pulse signal to the GATE output, thereby causing the switches 402, 404 to be turned on and off in accordance with the pulse signal.

As discussed further above, however, one of the main functions of the controller circuit 428 is to help protect the switches 402, 404 against in-rush currents.

In addition to protecting against in-rush current, the output circuit 216 assists in protecting against long term overcurrent conditions. Unlike an in-rush current, which is due to temporary large current draws of the notification appliances as they are initially activated, a long term overcurrent condition can occur from a system issue such as poor (i.e. ohmic) connections in the NAC, low voltage from a source, etc. Unlike an in-rush current, which requires temporary limiting until the in-rush condition resolves in the normal course, a long term overcurrent condition indicative of slow system degradation and can indicate the need for maintenance. If the overcurrent is over a limit, it may be necessary to disable the switches 402, 404.

To detect an overcurrent, the current measurement circuit 430 and the processing circuit 206 of FIG. 2 cooperate to obtain the current sense signal and determine whether the current exceeds an overcurrent threshold. The overcurrent threshold is different from the in-rush current threshold. This overcurrent threshold is set to another value that is indicative of a long term overcurrent problem in the circuit, as opposed to an instantaneous spike in current that could be associated with in-rush. To carry out such functionality, the measurement circuit 430 includes a differential amplifier 438 having differential inputs that are operably coupled to the source 429 and the current sense node 431. The differential amplifier 438 is configured via bias voltages and resistors to provide an output voltage signal at terminal 442 representative of the current through the sense resistor 426. This output voltage signal at the terminal 442 is scaled for input to an A/D converter, not shown, which is part of the processing circuit 206 of FIG. 2. The processing circuit 206 further contains logic to determine if the measured current exceeds the predetermined threshold for a predetermined time. The predetermined time threshold also ensures that a measured overcurrent is not simply an instantaneous spike.

The processing circuit 206 further contains logic to signal the overcurrent condition in the display 230 or otherwise. The processing circuit 206 also contains logic to provide a control signal to disable the switches 402, 404 in the event of an overcurrent detection. To this end, the processing circuit 206 is configured to provide a suitable control signal to EN input of the controller circuit 428 responsive to determining that the measured current exceeds the predetermined threshold for the predetermined time. As discussed above, the predetermined threshold and time are selected such that ordinary in-rush current events do not trigger the disabling of the GATE output.

Thus, while the current sense resistor 426, controller circuit 428, and MOSFET devices 402, 404 can provide current limiting of in-rush currents, those same elements, in combination with the current measurement circuit 430 and processing circuit 206, further provide protection in the form of a shut-down in the event of a steady-state or otherwise less transient overcurrent situation.

As discussed above, the first output arrangement 420 further includes test voltage circuitry. In particular, the test voltage input 432 and test voltage measurement circuit 434 cooperate to perform tests that measure for proper continuity in the conductors of the NACs attached to the NAC outputs 218, 220, 222 and 224. The test voltage input 432 is configured to be selectively connected to a negative voltage source, and preferably a −12 VDC source. The test voltage input 432 is further connected to the first notification signal output 425 via a serially connected resistor 436. In the embodiment described herein, the resistor 436 is advantageously chosen to be the same resistance as the EOL resistor 418, 24 k-ohms.

The test voltage measurement circuit 434 is operably coupled to condition the voltage on the first notification signal output 425. More specifically, the test voltage measurement circuit 434 includes an amplifier 438 having differential inputs connected to, respectively, the first notification signal output 425 and biasing voltage and resistors. The biasing voltages, resistors and the amplifier 438 are configured to provide an output voltage that suitable for conversion by an A/D converter not shown, in the processing circuit 206. The output voltage at the output terminal 440 of the measurement circuit 434 is provided to the A/D converter of the processing circuit 206 of FIG. 2. The processing circuit 206 is configured to determine whether the measured voltage is above the first threshold or below the second threshold. As will be discussed below in further detail, if the voltage measured by the test voltage measurement circuit 434 is above a first threshold, then it is indicative of a short circuit in the NAC. If the voltage measured by the test voltage measurement circuit 434 is below a second threshold, then it is indicative of an open circuit in the NAC. The processing circuit 206 is further configured to generate a trouble signal if measured voltage is determined to be outside of the acceptable range. The processing circuit 206 may further provide, via the display 230, an indication of whether the measured test voltage indicates a possible short or a possible open circuit.

In normal operation, the system has three basic conditions, active, inactive (i.e ready), or test. In the active condition, an alarm notification signal is provided to the NAC outputs 218, 220, 222 and 224. An active condition will occur, for example, when a fire or other emergency condition has been detected. In the inactive condition, no voltage or notification signal is provided to the NAC outputs 218, 220, 222 and 224. The inactive condition represents the normal, non-emergency condition of the fire safety system. In the test condition, also known as "supervisory" mode, no alarm notification signal is present, but a special test signal is applied.

In the following description of the operations of the output circuit 216, it will be assumed that the NAC outputs 218, 220, 222 and 224 are configured for class A operation. Thus, the outputs 218 and 220 are connected to one NAC, and the outputs 222 and 224 are connected to a different NAC. This arrangement is similar to that of FIG. 3a. In such an operation, the switchable terminals 414, 416 are configured such that the second output arrangement 422 is coupled to the NAC output 222 and ground is connected to the NAC output 224. In general, the operations of the first output arrangement 420 are described below. The operations of the first output arrangement 420 largely do not affect the NAC outputs 222 and 224 in this configuration. Instead, the second output arrangement 422 controls the NAC outputs 224, 222. In general, however, the second output arrangement 422 operates in the same manner as the first output arrangement 420.

In the inactive condition, the NAC output 218 is disconnected from the notification voltage source 429 by the MOSFET switch 402. To this end, the processing circuit 206 of FIG. 2 provides a control signal to the controller circuit 428 that causes the controller circuit 428 to provide little or no gate voltage to the MOSFET switches 402. The MOSFET switch 404 also receives no gate voltage. However, in the class A configuration, the MOSFET switch 404 is disconnected from the active part of the circuit of FIG. 4.

In order to place the MOSFET 402 in the off state, the processing circuit 206 provides a disabling control signal to the EN input, thereby causing the controller circuit 428 to provide no turn-on voltage to the MOSFET switch 402 via the output GATE. Alternatively, or in addition, the actual source 429 of notification signal voltage may lack any voltage. In other words, the processing circuit 206 may, in the inactive state, cause the source input 429 of the output arrangement 420 to be disconnected from the 24-26 volt output of the supply 206 and/or boost circuit 214. (See FIG. 2).

By contrast, in the active condition (i.e. the processing circuit 206 determines that an alarm condition is present), the processing circuit 206 enables the controller circuit 428 by providing a suitable control signal to the EN input of the controller circuit 428. In addition, a 24-26 volt signal is received at the source 429.

The first output arrangement 420 controls the application of the 24-26 volt signal to the NAC connected to the outputs 218 and 220. In particular, the controller circuit 428 closes the switch 402. The closing of the switch 402 couples the 24-26 volt notification signal from the source 429 to the NAC output 218, which then provides the notification signal to the devices of the NAC. The ground connection to the NAC output 220 provides ground to the return conductor of the NAC. Upon initial closing of the switch 402 (and/or providing the 24-26 voltage at the source 429), the initial current draw of the devices on the NAC can create an in-rush current. The controller circuit 428 detects whether this initial current draw or in-rush current exceeds a predetermined threshold. To this end, the controller circuit 428 receives a current sense signal from the current sense node 431. The controller circuit 428 determines the difference between the current sense signal and the voltage at the input VCC and divides the resulting difference by the resistance of the current sense resistor 426 to obtain a current measurement. The controller circuit 428 also compares the current measurement to a threshold corresponding to the in-rush current threshold. If the current exceeds the in-rush current threshold, then the controller circuit 428 adjusts the gate voltage such that the in-rush current is limited using the hotswap controller arrangement, not shown, disposed therein. It is noted that the controller circuit 428 will furthermore shut down the output to the GATE output if the in-rush current is not reduced after a predetermined time, for example 15 mSec. The shutdown delay may be set by attaching a capacitor of a select value corresponding to the delay to a TIMER input of the controller circuit 428.

Assuming that the in-rush current expires in a timely manner, the switch 402 will then be in the conductive or "on" state and the 24-26 volts from the source 429 is provided to the NAC connected to the outputs 218 and 220. The steady state 24-26 volts received from the sourced 429 may be directly used as the notification signal, as many appliances are designed to provide notification responsive to a simple DC voltage. However, there are times in which the notification signal has a pattern, such as a repeating pattern of pulses. To provide such a pattern, the processing circuit 206 (of FIG. 2) may provide corresponding pulse signals to the EN input that cause the controller circuit 428 to controllably open and close the switch 402 in the pulsed pattern.

In the test operation, the processing circuit 206 provides a control signal to EN that disables the controller circuit 428. This may occur as a natural result of being in the inactive state. The processing circuit 206 (or some other circuit) causes a −12V signal to be applied to the test voltage input 432. If the NAC is in good condition, then the application of the −12V signal to the test voltage input 432 creates a −12V circuit from the test voltage input 432 to the ground connected to the NAC output 220. The complete circuit includes the resistor 436, the feed conductor (not shown) connected to the NAC output 218, the EOL resistor (not shown) of the NAC connected to the feed conductor, and the return conductor (not shown) connected to the NAC output 220. (See also FIG. 3*a* for an example of a feed conductor 306, EOL resistor 312, and return conductor 308 of an NAC 302 connected for class A operation).

If the NAC is in good working order, then the voltage at the notification signal output 425 should be the −12V test voltage divided between the resistor 436 and the EOL resistor (e.g. EOL resistor 312 of FIG. 3*a*) of the NAC connected to the outputs 218, 220. Because the resistor 436 is in this embodiment chosen to be the same resistance as the EOL resistor, the voltage at the first notification signal output 425 should be ½ of the test voltage, or −6V. By contrast, if the NAC has a short circuit between the feed and return conductors, then the EOL resistor of the NAC will be bypassed and the entire −12V is dropped over the resistor 436. As a result, a shorted NAC will cause the voltage at the output 425 to be near zero. However, if the NAC has an open circuit anywhere on the feed and return conductors, then the test path will be open circuited, and the entire −12V test voltage will appear at the output 425.

In any event, the test voltage measurement circuit 434 then scales the measured voltage on the output 425 to a level compatible with the A/D converter of the processing circuit 206. The processing circuit 206 then compares the scaled (and A/D converted) measured voltage value to two thresholds. The first threshold corresponds to a measured voltage that exceeds −6V by a predetermined amount, indicating a possible short circuit between the feed and return conductors of the NAC. The second threshold corresponds to a measured voltage that is less than −6V by a predetermined amount, indicating a possible open circuit (or other source of high impedance) in the NAC feed and return conductors. If the processing circuit 206 determines that the measured voltage exceeds the first threshold, then the processing circuit 206 indicates an fault condition via the display 230 or other means, and further sets an internal fault flag or register value. Similarly, if the processing circuit 206 determines that the measured voltage is less than the second threshold, then the processing device indicates an fault condition via the display 230 or other means, and further sets an internal fault flag or register value. If the processing circuit 206 determines that the measured voltage falls between the two thresholds, then the processing circuit 206 may return to normal inactive state operation without storing a fault condition flag or indication.

The inactive, active and test operations of the circuit of FIG. 4 will now be described with reference to a condition in which the NAC outputs 218, 220, 222 and 224 are configured for class B operation. In such a configuration, all of the outputs 218, 220, 222 and 224 are connected to a single NAC. This arrangement is similar to that of FIG. 3*b*. Thus, in class B configuration, the feed conductor of the NAC extends from the NAC output 218, throughout the length of the NAC and back to the NAC output 222. Similarly, the return conductor extends from the NAC output 220, throughout the length of the NAC and back to the NAC output 224. In such a configuration, the switchable terminals 414, 416 are configured such that the NAC output 222 is connected via the internal EOL resistor 418 to the notification signal output 424 and the NAC output 224 is connected directly to the notification signal output 424. In class B operation, the first output arrangement 420 controls all of the NAC outputs 218, 220, 222 and 224. The second output arrangement 422 is not used.

In inactive condition, the NAC outputs 218, 220, 222 and 224 are disconnected from the notification voltage source 429 by the MOSFET switches 402 and 404. To this end, the processing circuit 206 of FIG. 2 provides a control signal to the controller circuit 428 that causes the controller circuit 428 to provide little or no gate voltage to the MOSFET switches 402, 404.

To turn off the MOSFET switches 402 and 404, the processing circuit 206 provides a disabling control signal to the EN input, thereby causing the controller circuit 428 to provide no turn-on voltage at the GATE, which in turn feeds no voltage the MOSFET switches 402 and 404. Alternatively, or in addition, the processing circuit 206 may, in the inactive state, cause the source input 429 of the output arrangement 420 to be disconnected from the 24-26 volt output of the supply 206 and/or boost circuit 214.

By contrast, in the active condition (i.e. the processing circuit 206 determines that an alarm condition is present), the processing circuit 206 enables the controller circuit 428 by providing a suitable control signal to the EN input of the controller circuit 428. In addition, a 24-26 volt signal is received at the source 429.

The first output arrangement 420 controls the application of the 24-26 volt signal to the NAC connected to the outputs 218, 220, 222 and 224. In particular, the controller circuit 428 closes the switches 402, 404. The closing of the switch 402 couples the 24-26 volt signal from the source 429 to the NAC outputs 222 and 218, which then provides the signal to the devices of the NAC. The ground connection to the NAC output 220 and the NAC output 224 (via Zener diode D2) provides ground to the return conductor of the NAC. Upon initial closing of the switches 402, 404 (and/or providing the 24-26 voltage at the source 429), the initial current draw of the devices on the NAC can create an in-rush current. The controller circuit 428 detects whether this initial current draw or in-rush current through both switches 402, 404 exceeds a predetermined threshold. As discussed above, the controller circuit 428 derives the current measurement from the current sense signal received from the current sense node 431 and the input voltage at the input VCC. As in class A operation, the controller circuit 428 compares the current measurement to a threshold corresponding to the in-rush current threshold. If the current exceeds the in-rush current threshold, then the controller circuit 428 adjusts the gate voltage such that the in-rush current is limited using the hotswap controller functionality disposed therein. As also discussed further above, the controller circuit 428 will furthermore shutdown the output to the gate if the in-rush current is not reduced after a predetermined time, for example, 15 milliseconds.

Assuming that the in-rush current expires in a timely manner, the switches 402, 404 will be in the on-state and the 24-26 volt signal from the source 429 is provided to the NAC connected to the outputs 222 and 218. As with the class A operation, the processing circuit 206 (of FIG. 2) may provide pulse signals to the EN input that cause the controller circuit 428 to controllably open and close the switches 402, 404 in the pulsed pattern to create a pulsed notification signal.

In the test operation, the processing circuit 206 provides a control signal to EN that disables the controller circuit 428. This may occur as a natural result of being in the inactive state. The processing circuit 206 (or some other circuit) causes a −12V test voltage to be applied to the test voltage input 432. If the NAC is in good condition, then application of the −12V signal to the test voltage input 432 creates a complete circuit path for the −12V test voltage between the test voltage input 432 and the ground connected to the NAC output 220. In the class B configuration, the complete circuit includes the resistor 436, the feed conductor (not shown) connected to the NAC output 218, the looped-back feed conductor (not shown) connected to the NAC output 222, the EOL resistor 418, and the return conductor (not shown) connected to the NAC output 224, and the looped-back return conductor (not shown) connected to the NAC output 220. (See also FIG. 3*a* for an example of a looped back feed conductor 356, and a looped back return conductor 358 of an NAC 352 connected for class B operation).

If the NAC is in good working order, then the voltage at the notification signal output 425 should be the −12V test voltage divided between the resistor 436 and the EOL resistor 418. Because the resistor 436 is in this embodiment chosen to be the same resistance as the EOL resistor 418, the voltage at the first notification signal output 425 should be one-half of the test voltage, or −6V. By contrast, if the NAC has a short circuit between the feed and return conductors, then the EOL resistor 418 will be bypassed and all or much of the −12V test voltage is dropped over the resistor 436. As a result, a shorted NAC will cause the voltage at the output 425 to be near zero. However, if the NAC has an open circuit anywhere on the feed and return conductors, then the test path will be open circuited, and the entire −12V test voltage will appear at the output 425.

In any event, the test voltage measurement circuit 434 and processing circuit 206 cooperate as discussed further above to determine whether the voltage at the output 425 is within an acceptable window between first and second thresholds.

If the processing circuit 206 determines that the measured voltage exceeds the first threshold, then the processing device indicates an fault condition via the display 230 or other means, and further sets an internal fault flag or register value. Similarly, if the processing circuit 206 determines that the measured voltage is less than the second threshold, then the processing device indicates an fault condition via the display 230 or other means, and further sets an internal fault flag or register value. If the processing circuit 206 determines that the measured voltage falls between the two thresholds, then the processing circuit 206 may return to normal inactive state operation without storing a fault condition flag or indication.

Thus, embodiments of the present invention provide among other things, a way of employing switches for notification signals in an NAC that are not subject to the problems of electromechanical relays. Such switches, which are in the form of semiconductor switches, are furthermore protected from damage that may be sustained by in-rush currents that have been found to be created with fire notification appliances of an NAC are activated. In one embodiment, a hotswap controller performs current limiting through the semiconductor switch during the in-rush current period.

Some embodiments further include the test circuit that is capable of testing NACs configured for either class A or class B operation for continuity and short circuits. This test circuit further eliminates the need for a special relay, as was known in the prior art, to reverse the polarity of the NAC circuit to perform tests.

It will be appreciated that the above describe embodiments are merely exemplary. Those of ordinary skill in the art may readily devise their own modifications and implementations that incorporate the principles of the present invention and fall within the spirit and scope thereof. For example, devices other than notification extensions devices may employ the technology described herein.

We claim:

1. A safety notification system comprising:
   a detector device configured to detect an alarm event and to generate an indication of the alarm event;
   a fire control panel connected to the detector device and configured to receive the indication from the detector device and to generate a notification signal based on the indication; and
   an arrangement connected to the fire control panel and configured to receive the notification signal, the arrangement comprising:
   an alarm signal power source, the alarm signal power source configured to generate bias power for activating a notification appliance circuit of a notification extension loop responsive to receiving the notification signal;
   at least a first semiconductor device having a load path coupled between the alarm signal power source and the notification appliance circuit to selectively activate the notification appliance circuit;
   a current sensing unit operably coupled between the alarm signal power source and the first semiconductor device and configured to generate a current sensing signal that is dependent on the current in the load path, the current sensing signal indicative of whether the current through the load path exceeds an in-rush current threshold;
   a processing circuit operably coupled to a current measurement circuit which is coupled to the current sensing unit and configured to generate an overcurrent detection signal, based on the current sensing signal, indicative of whether an average of the current through the load path over a predetermined period of time exceeds a steady state current threshold, the steady state current threshold being different from the in-rush current threshold; and
   a controller circuit operably connected to receive the current sensing signal and wherein the controller circuit is configured to control the first semiconductor device responsive to the current sensing signal exceeding the in-rush current threshold and the average of the current over the predetermined period of time being less than or equal to the steady state current threshold;
wherein the processing circuit is configured to cause the controller circuit to control the first semiconductor device such that the first semiconductor device does not conduct the current through the load path responsive to the overcurrent detection signal, different from the current sensing signal, indicating that the average of the current through the load path over the predetermined period of time exceeds the steady state threshold.

2. The safety notification system of claim 1, wherein the first semiconductor device is a MOSFET.

3. The safety notification system of claim 2, wherein the current sensing unit includes a sense resistor and wherein the current sensing signal comprises a voltage level of a terminal of the sense resistor.

4. The safety notification system of claim 1, wherein the controller circuit further comprises an input for receiving the current sensing signal.

5. The safety notification system of claim 2, wherein the controller circuit operably controls the MOSFET to limit the current through the load by changing a gate voltage of the MOSFET.

6. The safety notification system of claim 1, wherein the processing circuit is further configured to generate the overcurrent detection signal indicative of whether the average of the current through the load path over the predetermined period of time exceeds the steady state current threshold.

7. The safety notification system of claim 1, wherein the processing circuit is configured to generate a shutdown signal responsive to the overcurrent detection signal indicating that the average of the current through load path over the predetermined period of time exceeds the steady state threshold, and wherein the processing circuit is configured provide the shutdown signal to a first input of the controller circuit.

8. The safety notification system of claim 1, wherein the controller circuit is configured to limit, but not shut off, the current through the load path when the current exceeds the in-rush current threshold.

9. The safety notification system of claim 1, wherein the controller circuit is configured to shut down the first semiconductor device when the average of the current through the load path over the predetermined period of time exceeds the steady state current threshold.

10. A safety notification system comprising:
a detector device configured to detect an alarm event and to generate an indication of the alarm event;
a fire control panel connected to the detector device and configured to receive the indication from the detector device and to generate a notification signal based on the indication; and
an arrangement connected to the fire control panel and configured to receive the notification signal, the arrangement comprising:
an alarm signal power source, the alarm signal power source configured to generate bias power for activating a notification appliance circuit of a notification extension loop responsive to receiving the notification signal;
at least a first semiconductor device having a load path coupled between the alarm signal power source and the notification appliance circuit to selectively activate the notification appliance circuit;
a current sensing unit operably coupled between the alarm signal power source and the first semiconductor device and configured to generate a current sensing signal that is dependent on the current in the load path, the current sensing signal indicative of whether the current through the load path exceeds an in-rush current threshold;
a processing circuit operably coupled to a current measurement circuit which is coupled to the current sensing unit and configured to generate an overcurrent detection signal, based on the current sensing signal, whether an average of the current through the load path over a predetermined period of time exceeds a steady state current threshold; and
a hot swap controller operably connected to receive the current sensing signal and configured to control the first semiconductor device responsive to the current sensing signal and the overcurrent detection signal indicative of whether the average of the current through the load path over the predetermined period of time exceeds the steady state current threshold, the overcurrent detection signal being different from the current sensing signal, said control including limiting the current through the load path when said current exceeds the in-rush current threshold and the average of the current over the predetermined period of time that is less than or equal to the steady state current threshold;
wherein the processing circuit is configured to cause the hot swap controller to control the first semiconductor device such that the first semiconductor device does not conduct the current through the load path responsive to the overcurrent detection signal indicating that the average of the current through the load path over the predetermined period of time exceeds the steady state threshold.

11. The safety notification system of claim 10, wherein the first semiconductor device is a MOSFET.

12. The safety notification system of claim 11, wherein the current sensing unit includes a sense resistor and wherein the current sensing signal comprises a voltage level of a terminal of the sense resistor.

13. The safety notification system of claim 10, wherein the hot swap controller further comprises an input for receiving the current sensing signal.

14. The safety notification system of claim 11, wherein the hot swap controller operably controls the MOSFET to limit the current through the load by changing a gate voltage of the MOSFET.

15. The safety notification system of claim 10, wherein the processing circuit is further configured to generate the overcurrent detection signal indicative of whether the average of the current through the load path over the predetermined period of time exceeds the steady state current threshold.

16. The safety notification system of claim 10, wherein the processing circuit is configured to generate a shutdown signal responsive to the overcurrent detection signal indicating that the average of the current through the load path over the predetermined period of time exceeds the steady state threshold, and wherein the processing circuit is configured provide the shutdown signal to a first input of the hot swap controller.

* * * * *